April 20, 1937.  W. B. WALGER  2,077,972
THROTTLE VALVE
Filed Nov. 30, 1935  2 Sheets-Sheet 2
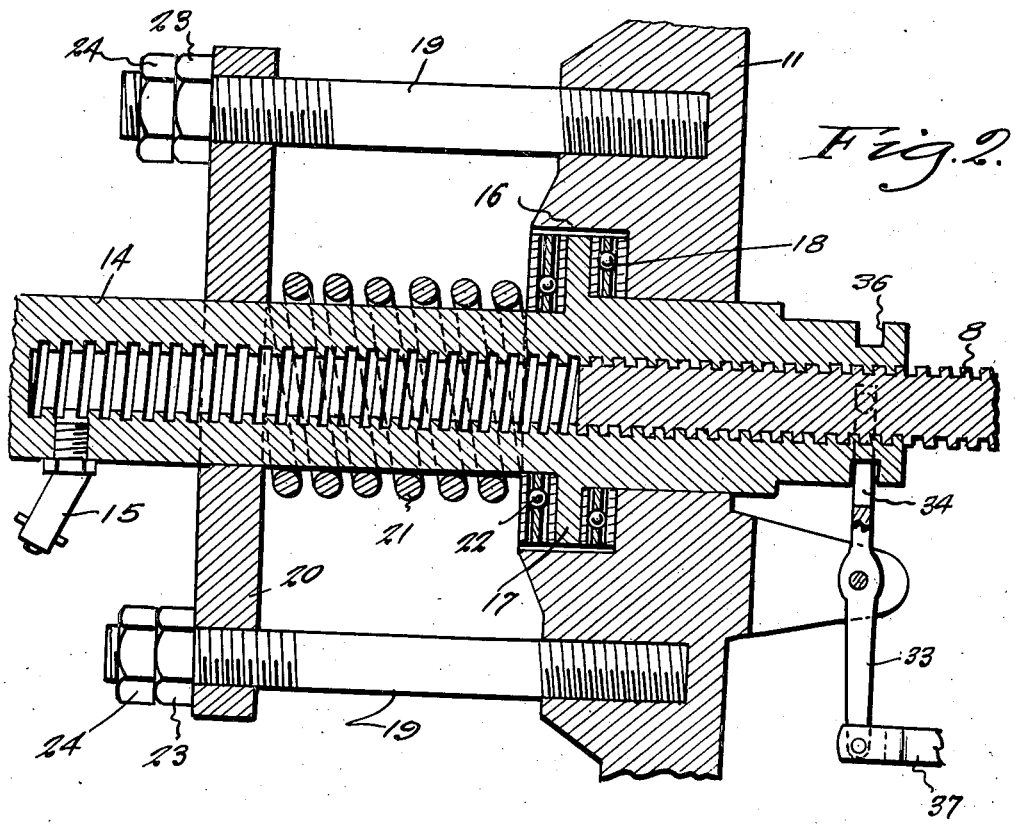
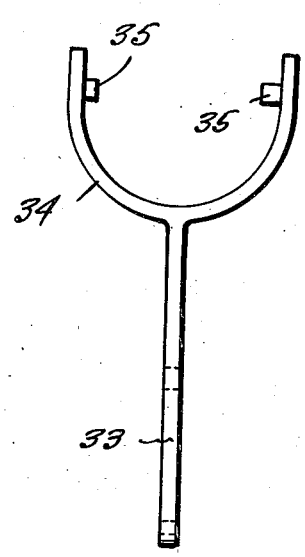
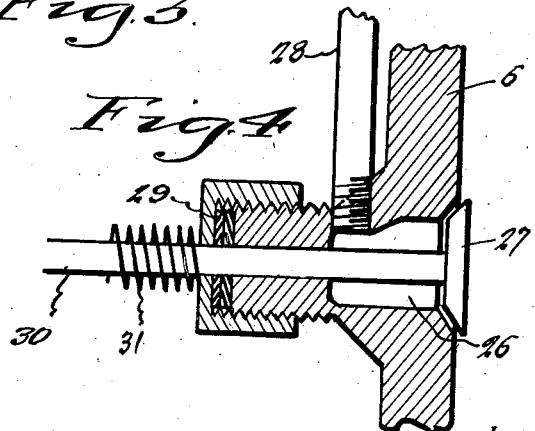
Inventor
Walter B. Walger
By Clarence A. O'Brien and
Hyman Berman  Attorneys Patented Apr. 20, 1937

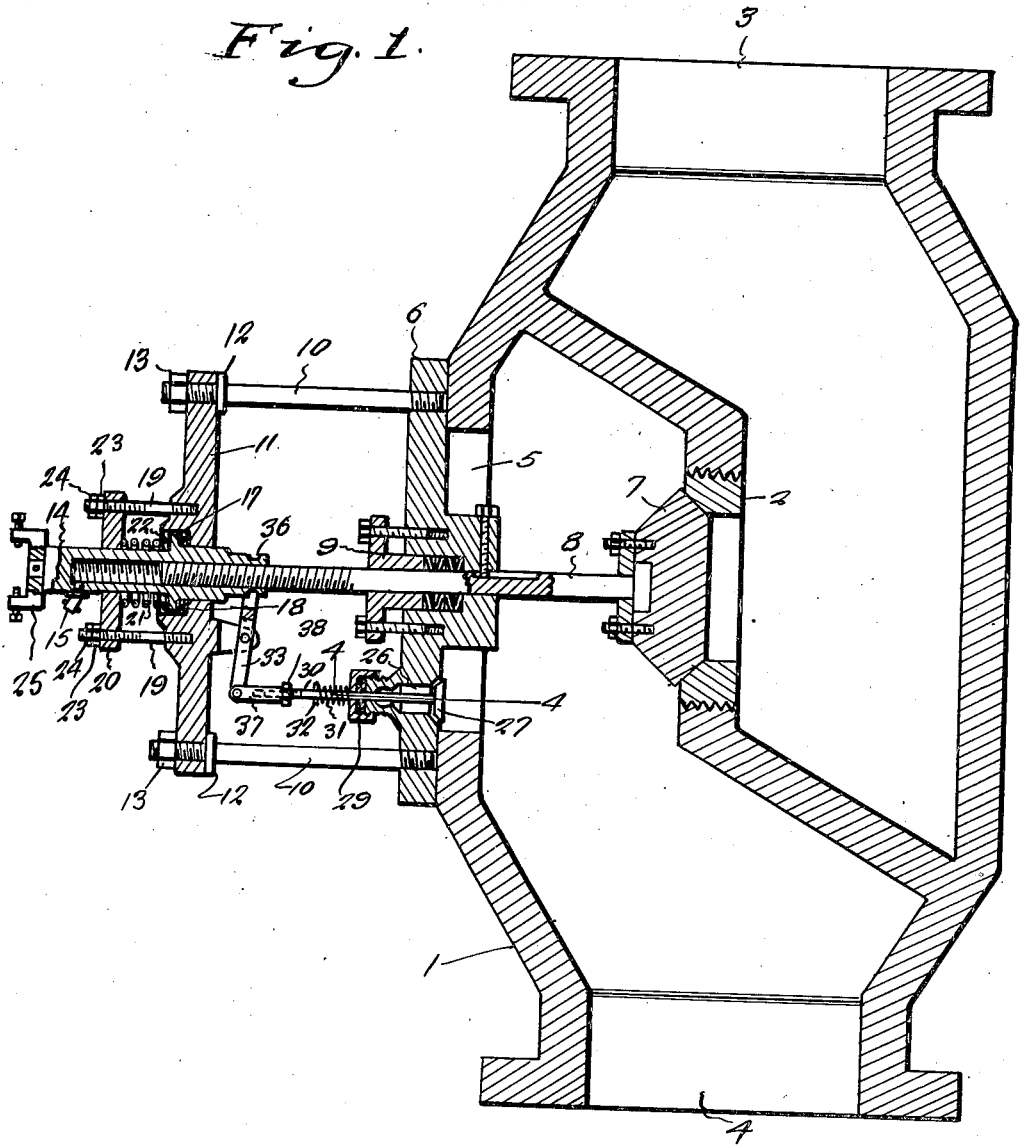

2,077,972

UNITED STATES PATENT OFFICE 2,077,972

THROTTLE VALVE

Walter B. Walger, Corpus Christi, Tex.

Application November 30, 1935, Serial No. 52,409

1 Claim. (Cl. 277—15)

The present invention relates to new and useful improvements in throttle valves for steam engines and has for its primary object to provide, in a manner as hereinafter set forth, a valve of this character embodying novel means for automatically and instantaneously releasing the steam from the steam chest of the engine when the throttle valve is closed, thus causing the engine to stop immediately.

Other objects of the invention are to provide a throttle valve of the aforementioned character which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1 is a vertical sectional view through a throttle valve constructed in accordance with the present invention.

Figure 2 is a vertical sectional view on an enlarged scale through the operating means for the throttle valve.

Figure 3 is a detail view in elevation of the release valve actuating lever.

Figure 4 is a detail view in cross section through the release valve, taken substantially on the line 4—4 of Figure 1.

Referring now to the drawings in detail, it will be seen that the embodiment of the invention which has been illustrated comprises a metallic casing 1 having threadedly mounted therein a removable seat 2. The reference numeral 3 designates the intake end of the casing 1 and 4 designates the outlet or discharge end thereof. On the outlet side of the seat 2 the casing 1 has formed therein an opening 5 for which a closure 6 is provided.

The reference numeral 7 designates a valve which is engageable with the seat 2, said valve 7 being rotatably mounted on one end of a stem 8 which is splined in the closure 6. A packing 9 is provided in the closure 6 for preventing leakage around the stem 8.

Threadedly mounted in the closure 6 are posts 10 having mounted on their free end portions a plate constituting a bearing 11. The bearing 11 is mounted between flanges 12 and nuts 13 on the posts 10. The outer end portion of the stem 8 is threadedly engaged in a shaft 14 which is rotatably and slidably mounted in the bearing 11. A fitting 15 is provided for lubricating the stem 8 in the shaft 14. As illustrated to advantage in Figure 2 of the drawings, the outer face of the bearing plate 11 has formed therein a socket 16 which accommodates a flange 17 on an intermediate portion of the shaft 14. A thrust bearing 18 is provided between the flange 17 and the bearing plate 11.

Threadedly mounted in the bearing plate 11 and projecting outwardly therefrom are guide rods 19 on which a plate 20 is mounted for sliding adjusting, the shaft 14 extending rotatably and slidably through said plate 20. A coil spring 21 maintains the valve 7 in its closed position, said spring 21 encircling the shaft 14 and having one end engaged with the plate 20 and its other end engaged with a thrust bearing 22 which is provided between said spring 21 and the flange 17. Nuts 23 are provided on the guide rods 19 for shifting the plate 20 in a manner to regulate the tension of the spring 21 as desired, lock nuts 24 being provided for said nuts 23. Suitable means, as at 25, is provided on the outer end of the shaft 14 for connection with an operating means (not shown).

The closure 6 has formed therein a release port 26 which is controlled by a release valve 27 of the poppet type, a discharge pipe 28 communicating with said port 26. A packing 29 is provided for the stem 30 of the valve 27. A coil spring 31 closes the valve 27, said coil spring encircling the stem 30 and having one end engaged with the gland or packing 29 and its other end engaged with a pin 32 which is mounted transversely in said stem 30.

Pivotally mounted, at an intermediate point, on the inner side of the bearing plate 11 is a lever 33 having on one end a yoke 34 which straddles the inner end portion of the shaft 14, the arms of said yoke being provided with lugs 35 (see Figure 3) which are engaged in an annular channel 36 in said shaft 14. Pivotally connected to the other end portion of the lever 33 is a sleeve 37 in which the valve stem 30 is threadedly engaged for adjustment. A lock nut 38 is provided for securing the stem 30 in adjusted position in the sleeve 27.

It is thought that the operation of the valve will be readily apparent from a consideration of the foregoing, particularly to those skilled in the art to which the invention pertains. To close the valve and release the steam automatically from the steam chest, the shaft 14 is rotated in a direction to engage the valve 7 with the seat 2. Then, continued rotation of the shaft 14 in this direction causes said shaft to move longitudinally in the bearing 11 against the tension of the coil spring 21, thus actuating the lever 33 for opening the release valve 27 against the tension of the spring 31. To open the valve 7 the shaft 14 is rotated in the opposite direction and said shaft is caused to move inwardly on the stem 8 by the spring 21. This movement of the shaft 14, of course, swings the lever 33 in the opposite direction and permits the spring 31 to seat the release valve 27. After the release valve 27 is closed rotation of the shaft 14 is continued but said shaft has now stopped its longitudinal inward movement with the result that the stem 8 is now drawn outwardly in a manner to unseat the valve 7. The spring 21 is of sufficient strength to maintain the valve 7 in closed position against the pressure of the steam in the line.

It is believed that the many advantages of a throttle valve constructed in accordance with the present invention will be readily understood, and although a preferred embodiment of the device is as illustrated and described, it is to be understood that changes in the details of construction and in the combination and arrangement of parts may be resorted to which will fall within the scope of the invention as claimed.

What is claimed is:—

A device of the class described comprising a throttle valve, a release valve, means for opening said release valve when the throttle valve is completely closed comprising a stem extending laterally from said throttle valve, a support through which the stem is slidable, a collar rotatably and slidably mounted in the said support and threadedly connected to the free end of the stem, means for yieldably resisting the sliding movement of said collar in one direction, a stem extending laterally from the release valve, an arm pivotally mounted on the support having one end extending into a circumferentially arranged slot in the collar, the other end of the arm being pivotally connected to the free end of the stem of the release valve.

WALTER B. WALGER.